United States Patent [19]
Amaki et al.

[11] Patent Number: 5,768,011
[45] Date of Patent: Jun. 16, 1998

[54] OPTICAL AMPLIFYING REPEATER

[75] Inventors: Kazuya Amaki, Kawasaki; Takeo Osaka, Yokohama, both of Japan

[73] Assignee: Fujitsu Limited, Kanagawa, Japan

[21] Appl. No.: 587,396

[22] Filed: Jan. 17, 1996

[30] Foreign Application Priority Data

Mar. 20, 1995 [JP] Japan .................. 7-061084

[51] Int. Cl.⁶ .................. H04B 10/16; H04B 2/00
[52] U.S. Cl. .................. 359/341; 359/177; 359/194
[58] Field of Search .................. 359/177, 194, 359/341

[56] References Cited

U.S. PATENT DOCUMENTS

| | | | |
|---|---|---|---|
| 5,162,936 | 11/1992 | Taga et al. | 359/177 |
| 5,267,071 | 11/1993 | Little et al. | 359/194 |
| 5,296,957 | 3/1994 | Takahashi et al. | 359/177 |

FOREIGN PATENT DOCUMENTS

| | | |
|---|---|---|
| 59-9225650 | 12/1984 | Japan . |
| 62-279731 | 12/1987 | Japan . |
| 63-3310188 | 12/1988 | Japan . |
| 4069988 | 3/1992 | Japan . |
| 4299589 | 10/1992 | Japan . |

OTHER PUBLICATIONS

Metsner, B.P., Radio Eng. (USA), vol. 46, #4, pp. 73–76, Apr. 1991, abstract only herewithin.

*Primary Examiner*—Nelson Moskowitz
*Attorney, Agent, or Firm*—Helfgott & Karas, P. C.

[57] ABSTRACT

An optical amplifying repeater is provided whereby a transfer signal generated in response to a monitor signal from an end office is generated and amplified by a rare earth element doped fiber, the modulation degree with respect to the optical output of the fiber being held constant, regardless of the frequency of the this transfer signal. This optical amplifying repeater has a rare earth element (such as erbium) doped fiber, an automatic adjusting loop 12, and a monitor and response unit, and is further provided with a modulation degree compensation part for the purpose of holding constant the transfer signal modulation degree with respect to the optical output of the fiber, regardless of the frequency of the transfer signal.

11 Claims, 14 Drawing Sheets fc: CUTOFF FREQUENCY

OPTICAL AMPLIFYING REPEATER

BACKGROUND OF THE INVENTION

1. Field of the Invention

The present invention relates to an optical amplifying repeater.

For example, in an optical transmission line which is formed by a submarine cable, it is impossible to avoid attenuation of the optical signals which propagate along the optical transmission line, and for this reason the optical signals are amplified by intermediate repeaters.

In this case, optical amplifying repeaters which directly amplify the optical signal, without converting them to electrical signals, are widely use for the purpose of amplifying the optical signals. The present invention is described in terms of such an optical amplifying repeater, and particularly in terms of an optical amplifying repeater which makes use of a rare earth element doped fiber, such as an erbium-doped fiber (hereinafter referred to as an EDF).

2. Description of the Related Art

As will be described later with regard to the accompanying drawings, an optical amplifying repeater comprises an erbium-doped fiber (EDF), an automatic adjusting loop, and a monitor and response unit.

The erbium-doped fiber (EDF) receives and amplifies a supervisory signal. The automatic adjustment loop performs adjustment so that the optical amplification degree is automatically maintained at a constant value. The monitor and response unit, in response to a monitor signal, generates a transfer signal and via the automatic adjustment loop modulates the monitor signal in accordance with the transfer signal, and inputs it to the EDF.

The transfer signal with a modulation by the monitor signal appears in the optical output of the EDF, and is sent to the next stage. In this case, the transfer signal passes from a modulator in the monitor and response unit via a driver in the automatic adjusting loop, and reaches an optical generator, at which point modulation of the monitor signal occurs. The modulation is applied while performing automatic adjustment so that the applied modulation is always a constant level.

However, in the optical output of the EDF, it can be observed that the modulation degree of the transfer signal with respect to the optical output is not constant over the entire desired frequency band. That is, there is the problem that over a certain frequency band the transfer signal modulation degree with respect to the optical output of the EDF is not constant, the modulation degree being too small, so that reception at the end office is not possible, or the modulation degree being too large, so that there is an adverse effect on the monitor signal itself.

SUMMARY OF THE INVENTION

In view of the above problems, an object of the present invention is to provide an optical amplifying repeater which, regardless of the frequency of the transfer signal, is capable of maintaining the transfer signal modulation degree with respect to the optical output of the EDF constant.

To achieve the above-noted object, the present invention comprises a rare earth element doped fiber, an automatic adjusting loop, and a monitor and response unit, in which a modulation degree compensation means being further provided for the purpose of maintaining as constant, regardless of the frequency of the transfer signal, the modulation degree with respect to the optical output of the rare earth element doped fiber. By doing this, when the transfer signal, which is generated in response to a monitor signal from an end office, is amplified by a rare earth element doped fiber, regardless of the frequency of the transfer signal, the modulation degree with respect to the optical output of this fiber is maintained constant.

BRIEF DESCRIPTION OF THE DRAWINGS

The above object and features of the present invention will be more apparent form the following description of the preferred embodiments with reference being made to the accompanying drawings, wherein.

DESCRIPTION OF THE PREFERRED EMBODIMENT

Before describing the embodiments of the present invention, the related art and the disadvantages therein will be described, with reference being made to the related drawings.

Figure 16:
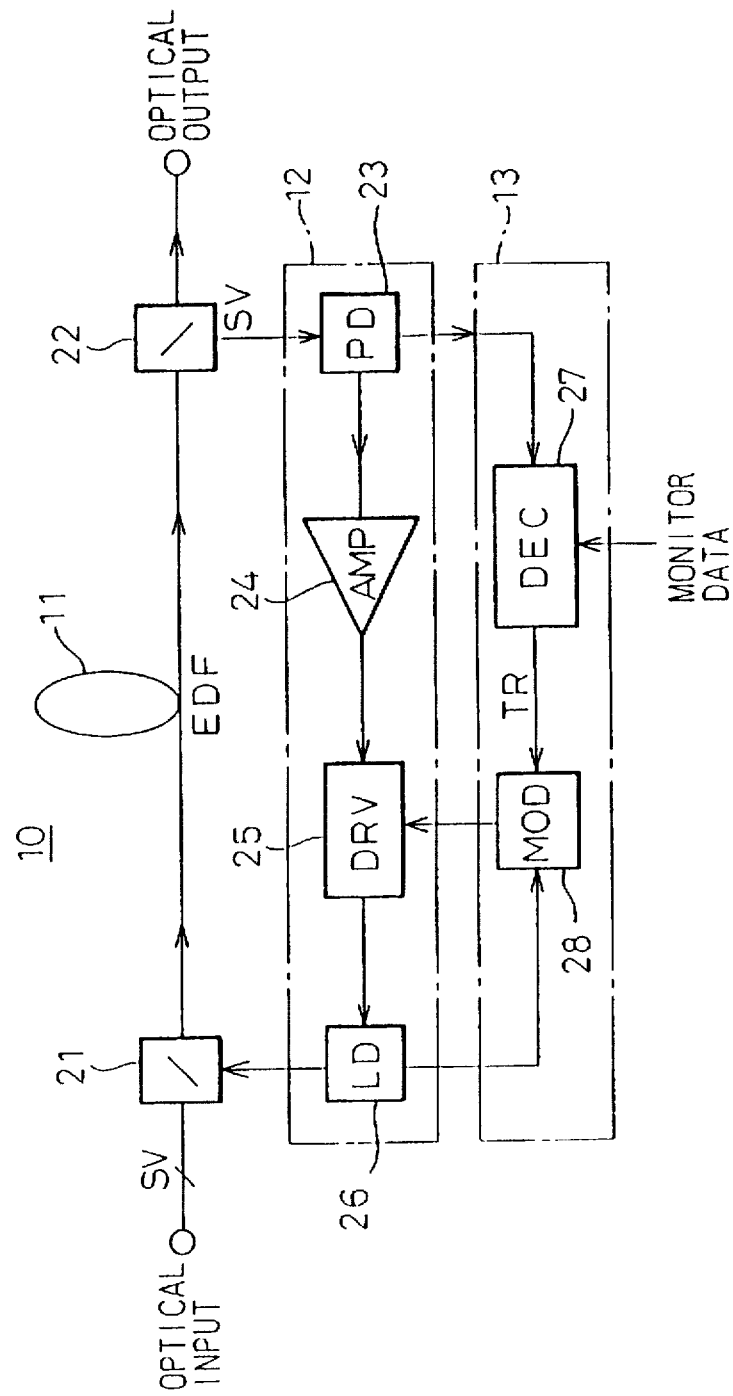
FIG. 16 is a drawing which shows an example of a general type of optical amplifying repeater.

FIG. 16 shows an example of a general type of optical amplifying repeater. In this drawing, the reference numeral 10 denotes an optical amplifying repeater, which chiefly comprises an erbium-doped fiber (EDF) 11 as a rare earth element doped fiber, an automatic adjusting loop 12, and a monitor and response unit 13. In addition, 21 is an optical mixer, and 22 is an optical splitter.

In more detail, the erbium-doped fiber (EDF) 11 receives and amplifies a high-frequency monitor signal SV. The automatic adjusting loop 12 performs automatic adjustment of the optical amplification degree so that it is maintained at a prescribed constant value. The monitor and response unit 13, in response to a monitor signal SV, generates a transfer signal TR and via the automatic adjusting loop 12 modulates the monitor signal in accordance with the transfer signal TR, and inputs it to the EDF 11.

For example, assume that a data failure occurs during a data transmission. This failure is detected by an end office (not shown in the drawing) which is disposed at one end (right side in the drawing) of an optical transmission line, which comprises a multi-stage cascade-connected plurality of optical amplifying repeaters such as the optical amplifying repeater 10, and notifies an end office (not shown in the drawing) disposed at the other end (left side in the drawing) of the optical transmission line.

Thereafter, the end office which receives the notification sends a monitor signal (for example, a high frequency of approximately 10 MHz) to the optical transmission line. This monitor signal SV includes data which specifies individual optical amplifying repeater 10 among the plurality of optical amplifying repeaters 10, and information which commands a specified optical amplifying repeater 10 monitor data such as the temperature, output level, or input level of to be output. The commanded data, such as temperature, output level, or input level and the like is transmitted by the pulse-type transfer signal TR (for example, a pulse train of low frequency such as 5 to 10 kHz), this being combined at the optical coupler 21 so as to modulate the above-noted monitor signal SV.

The transfer signal TR with a modulation of the monitor signal SV appears in the optical output of the EDF, and is sent to the next stage. In this case, the transfer signal TR passes from a modulator (MOD) in the monitor and response unit 13 unit via a driver 25 in the automatic adjusting loop 12, and reaches an optical generator (LD: laser diode) 26, at which point modulation of the monitor signal SV by the transfer signal TR occurs. The modulation is applied while performing automatic adjustment so that the applied modulation is always a constant level.

However, in the optical output of the EDF 11, it can be observed that the modulation degree of the transfer signal TR with respect to the optical output is not constant over the entire desired frequency band. That is, there is the above-noted problem that over a certain frequency band the transfer signal modulation degree with respect to the optical output of the EDF 11 is not constant, the modulation degree being too small, so that reception at the end office is not possible, or the modulation degree being too large, so that there is an adverse effect on the monitor signal SV itself.

The present invention provides an optical amplifying repeater which, regardless of the frequency of the transfer signal TR, is capable of maintaining the transfer signal TR modulation degree with respect to the optical output of the EDF 11 constant.

Figure 1:
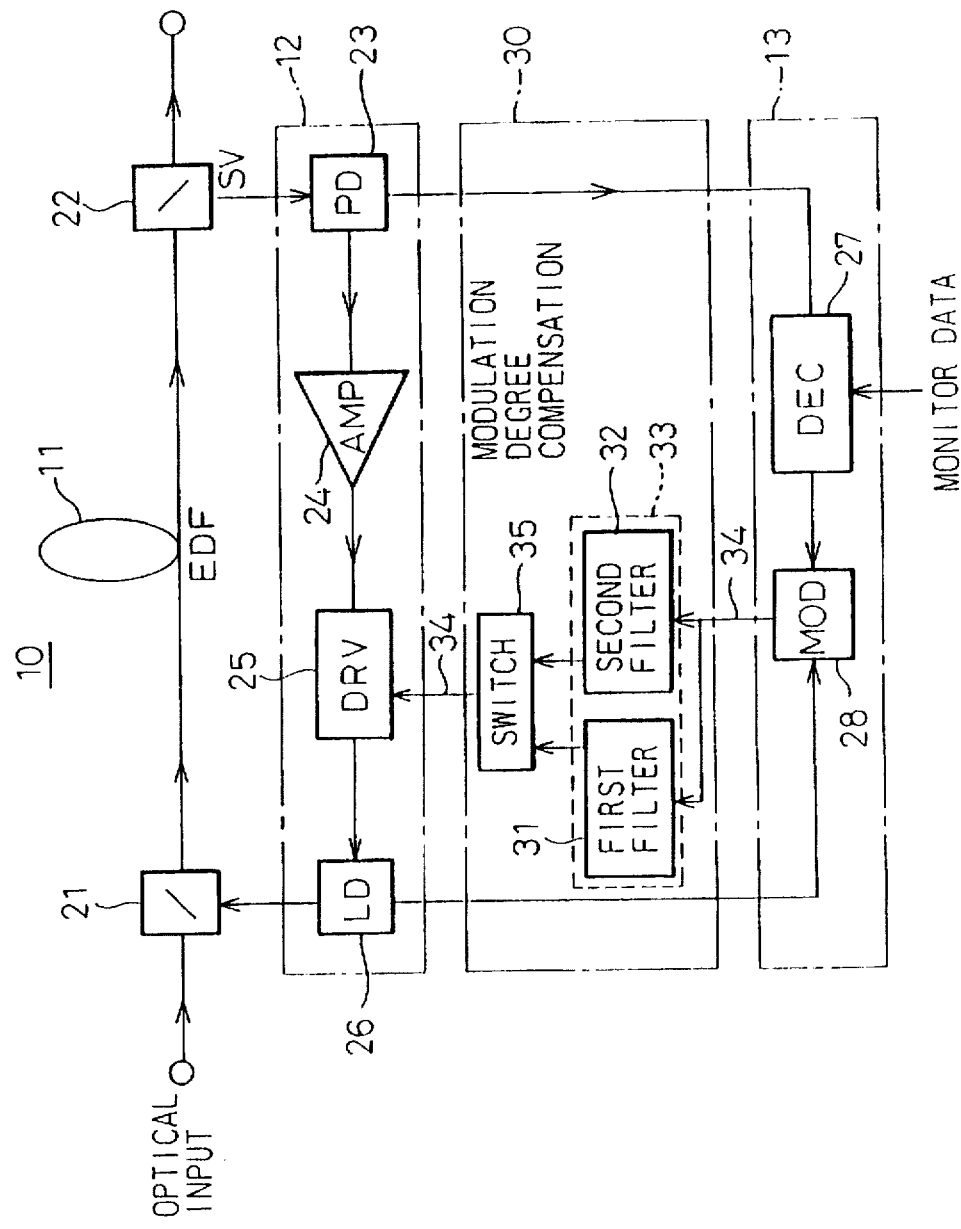
FIG. 1 is a drawing which shows a general view of a optical amplifying repeater according to the present invention.

FIG. 1 is a drawing which shows a general view of an optical amplifying repeater according to the present invention. In all of the drawings, similar constitutional elements are assigned the same reference numerals or symbols.

According to the first aspect of the present invention, the optical amplifying repeater 10 according to the present invention uses a modulation degree compensation means 30. The modulation degree compensation means 30 maintains the transfer signal TR modulation degree with respect to the optical output from a rare earth element doped fiber, such as an erbium-doped fiber (EDF 11), essentially constant, regardless of the frequency of the transfer signal TR.

According to the second aspect of the present invention, the modulation degree compensation means 30 comprises a first filter 31, this first filter 31 being provided with filter gain versus frequency characteristics which are the reverse of the gain modulation efficiency versus frequency characteristics of the EDF 11.

According to the third aspect of the present invention, the modulation degree compensation means 30 comprises a second filter 32, this second filter 32 being provided with filter gain versus frequency characteristics which are the reverse of the passband characteristics which represent the gain versus frequency characteristics of the EDF 11.

According to the fourth aspect of the present invention, the modulation degree compensation means 30 comprises a third filter 33, this third filter 33 having both filter gain versus frequency characteristics that are the reverse of the gain modulation efficiency versus frequency characteristics of the EDF 11 and filter gain versus frequency characteristics which are the reverse of the passband characteristics which represent the gain versus frequency characteristics of the EDF 11.

According to the fifth aspect of the present invention, a first filter 31, a second filter 32 and a switch means 35, which form the modulation degree compensation means 30, are inserted into the path 34 between the automatic adjusting loop 12 and a monitor and response unit 13. The switch means 35 performs change-over so as to select one of (1) insertion of the first filter 31 only into the path 34, (2) insertion of the second filter 32 only into the path 34, (3) insertion of both the first filter 31 and the second filter 32 into the path 34, and (4) elimination of both filters and short-circuiting of the path 34.

According to the sixth aspect of the present invention, the change-over according to the switch means 35 is remotely controlled by means of a change-over signal which is included in and sent with the monitor signal SV.

The seventh aspect of the present invention, as will be described clearly with reference made to drawings later, is implemented in accordance with a principle that differs from the above-noted first to sixth aspects of the present invention. Specifically, in an optical amplifying repeater 10 which comprises a rare earth element doped fiber, such as an erbium-doped fiber (EDF) 11, an automatic adjusting loop 12, and a monitor and response unit 13, a modulation degree setting means 40 is provided which maintains the transfer signal TR modulation degree with respect to the optical output of the EDF 11 as approximately constant, regardless of the frequency of the transfer signal TR.

According to the eighth aspect of the present invention, the modulation degree setting means 40 comprises a peak detection unit 41 which extracts the transfer signal TR component included in the optical output from the EDF 11, the automatic adjusting loop 12 performing control so that the detected peak value obtained by means of the peak detection unit 41 is maintained constant.

According to the ninth aspect of the present invention, a reference voltage which serves as the comparison criterion for the purpose of maintaining the above-noted detected peak value constant is settable by means of external control, and thereby the modulation degree can be arbitrarily set by means of the modulation degree setting means 40.

The automatic adjusting loop 12 in the present invention can be implemented using the output light power fixing method or the pumping light power fixing method.

The first to sixth aspects of the present invention are configured in accordance with the concepts described below.

Figure 2:
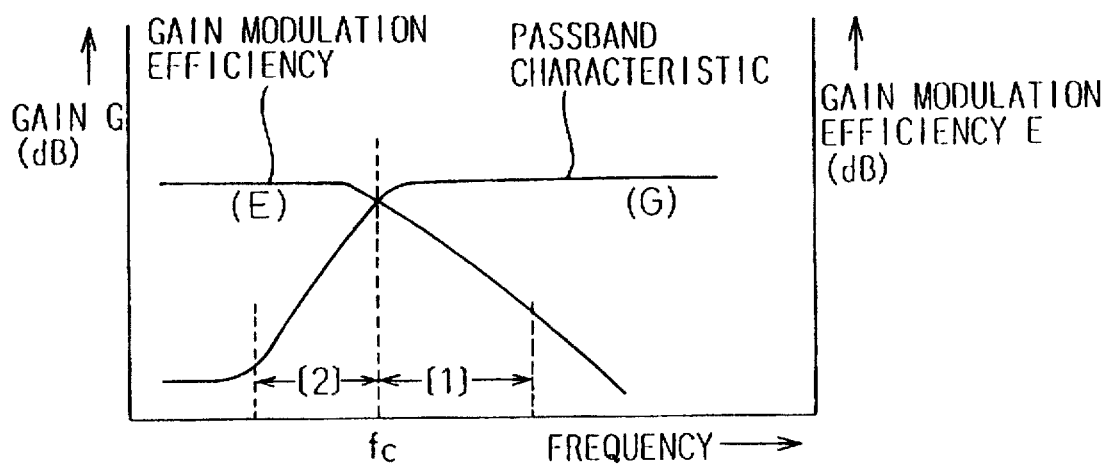
FIG. 2 is a graph which illustrates the first principle according to the present invention.

FIG. 2 is a graph which illustrates the first principle based on the present invention. This graph shows the passband characteristics and gain modulation efficiency of the EDF.

In the case in which the frequency of the transfer signal TR is in the frequency band indicated by [1] in FIG. 2, although the gain G exhibited in the passband characteristics is nearly constant, the gain modulation efficiency E drops sharply as the frequency approaches the high-frequency region. As a result, the transfer signal TR modulation degree with respect to the optical output of the EDF 11 becomes small.

In the case in which the frequency of the transfer signal TR is in the frequency band indicated by [2] in FIG. 2, although the gain modulation efficiency E is maintained nearly constant, the gain G exhibited in the passband characteristics drops sharply as the frequency approaches the low-frequency region. As a result, the transfer signal TR modulation degree with respect to the optical output of the EDF 11 becomes small.

The above-noted "gain modulation efficiency" is simply a representation of efficiency of application of the transfer signal TR onto the monitor signal SV at the optical coupler 21.

The modulation degree compensation means 30 of the present invention functions so as to provide filter characteristics such that E characteristics which drop off in the frequency band indicated as [1] in FIG. 2 are boosted upward. Additionally, it functions so as to provide filter characteristics such that G characteristics which drop off in the frequency band indicated as [2] in FIG. 2 are boosted upward.

In the above-noted second aspect of the present invention, the first filter 31 functions so as to raise the above-noted drop in E characteristics.

In the above-noted third aspect of the present invention, the second filter 32 functions so as to raise the above-noted drop in G characteristics.

In the above-noted fourth aspect of the present invention, the third filter 33 has the functions of both the two above-noted filters.

In the above-noted fifth aspect of the present invention, a switching operation allows simple and free selection and removal of the functions of the above-noted first filter 31, second filter 32, and third filter 33.

In the above-noted sixth aspect of the present invention, the remote control of a switch means in the above-noted fifth aspect of the present invention is enabled from, for example, a remote end office.

The above-noted seventh aspect of the present invention is implemented based on a principle that is different from the other principles of the present invention, using a modulation degree setting means 40, which is described later. Note, however, that the relying on the concept of controlling the transfer signal TR modulation degree with respect to the optical output of the EDF 11 is the same as the above-described first principle of the present invention.

Because of the existence of the automatic adjusting loop 12, the average value of the optical output of the EDF 11 is maintained constant. The peak value of the transfer signal TR component is detected. By doing this, the amplitude of the transfer signal TR is determined. By applying this to control elements in the automatic adjusting loop 12, it is possible to perform control so as to maintain the detected output as constant at all times. That is, the amplitude of the transfer signal TR which is included in the optical output of the EDF 11 is maintained constant at all times. As a result, the transfer signal TR modulation degree with respect to the optical output is held constant, regardless of the frequency of the transfer signal TR (even when in the regions [1] or [2] as indicated in FIG. 2).

In the above-noted eight aspect of the present invention, a peak detection unit 41 is provided for the purpose of performing the above-noted peak detection.

In the above-noted ninth aspect of the present invention, it is possible to set a desired modulation degree remotely from, for example, the above-noted end office.

The automatic adjusting loop 12 can be formed by using either the output light power fixing method or the pumping light power fixing method.

Figure 3:
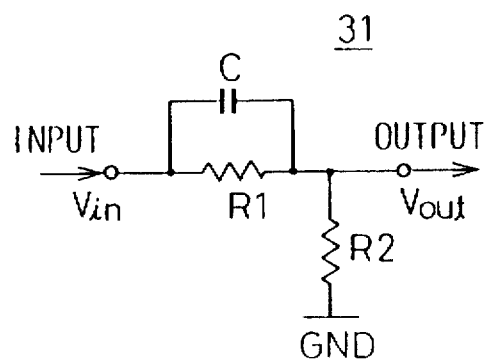
FIG. 3 is drawing which shows a detailed example of the first filter 31.

FIG. 3 is a drawing which shows a detailed example of the first filter 31. The first filter 31 indicated in FIG. 1 is shown by example in this drawing, in which the first filter 31 is configured simply by a capacitor C, a first resistor R1, and a second resistor R2. Equation (1) below gives the relationship between the input voltage $V_{in}$ and the output voltage $V_{out}$ with these elements C, R1, and R2 as parameters.

$$\frac{V_{out}}{V_{in}} = \frac{R2 + j\omega C \times R1 \times R2}{(R1 + R2) + j\omega C \times R1 \times R2} \quad (1)$$

Figure 4:
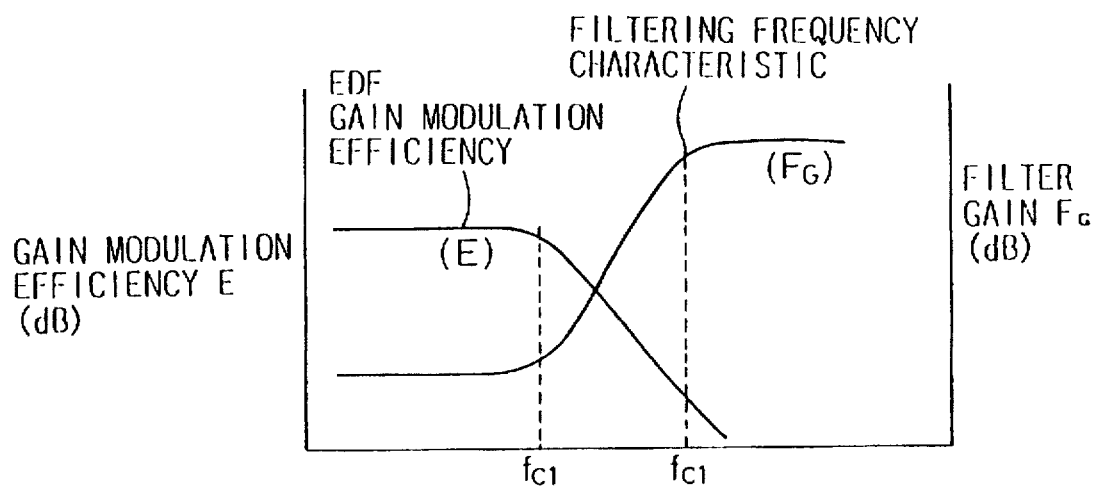
FIG. 4 is a graph which represents the frequency characteristics exhibited by the filter 31 of FIG. 3.

FIG. 4 is a graph which represents the filter frequency characteristics exhibited by the filter 31 shown in FIG. 3. The frequency characteristics ($F_G$) exhibited by a first filter 31 configured as shown in FIG. 3, as shown in this drawing, are filter gain ($F_G$) versus frequency characteristic which are the reverse of the gain modulation efficiency versus frequency characteristics (E in FIGS. 2 and 4) of the EDF 11. In this case, the first cutoff frequency $f_{c1}$ and the second cutoff frequency $f_{c2}$ are expressed by Equation (2) and Equation (3), respectively.

$$f_{c1} = \frac{1}{2\pi \times C \times R1} \quad (2)$$

$$f_{c2} = \frac{1}{2\pi \times C \times (R1//R2)} \quad (3)$$

Figure 5:
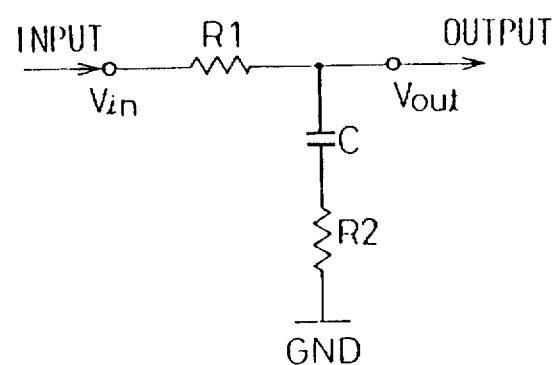
FIG. 5 is a drawing which shows a detailed example of the second filter 32.

FIG. 5 is a drawing which shows a detailed example of the second filter 32. The second filter 32 indicated in FIG. 5 is shown by example in this drawing, in which the second filter is configured simply by a capacitor C, a first resistor R1, and a second resistor R2. Note here that the specific values of these elements shown in FIG. 5 are not the same as those shown in FIG. 3. Equation (4) below gives the relationship between the input voltage $V_{in}$ and the output voltage $V_{out}$ with these elements C, R1, and R2 as parameters.

$$\frac{V_{out}}{V_{in}} = \frac{1 + j\omega C \times R2}{1 + j\omega C \times (R1 + R2)} \quad (4)$$

Figure 6:
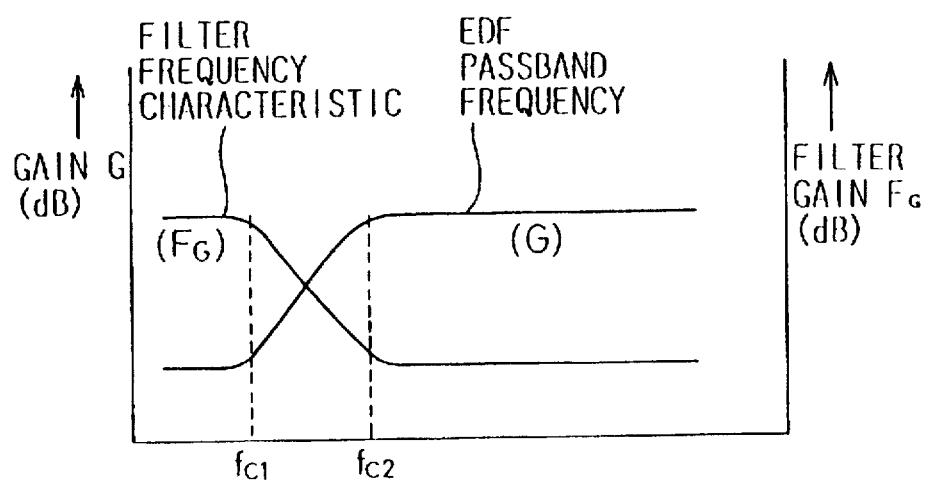
FIG. 6 is a graph which represents the frequency characteristics exhibited by the filter 32 of FIG. 5.

FIG. 6 is a graph which represents the filter frequency characteristics exhibited by the filter 32 shown in FIG. 5. The frequency characteristics ($F_G$) exhibited by a second filter 32 configured as shown in FIG. 5, as shown in this drawing, are filter gain ($F_G$) versus frequency characteristic which are the reverse of the passband characteristics which are expressed by the gain versus frequency characteristics (G in FIGS. 2 and 4) of the EDF 11. In this case, the first cutoff frequency $f_{c1}$ and the second cutoff frequency $f_{c2}$ are expressed by Equation (5) and Equation (6), respectively.

$$f_{c1} = \frac{1}{2\pi \times C \times (R1 + R2)} \quad (5)$$

$$f_{c2} = \frac{1}{2\pi \times C \times R2} \quad (6)$$

In this manner, because when the transfer signal TR frequency is in the frequency range indicated by [1] in FIG. 2, the gain modulation efficiency E deteriorates at the high-frequency side, the first filter 31, which has characteristics which are the reverse of the efficiency characteristics E, is inserted into the path 34 between modulator 28 and the driver 25 of FIG. 1. By doing this, the transfer signal TR modulation degree with respect to the optical output of the EDF 11 are held constant, regardless of the frequency of the transfer signal TR.

In a similar manner, because when the transfer signal TR frequency is in the frequency range indicated by [2] in FIG. 2, the gain of EDF deteriorates at the low-frequency side, the second filter 32, which has characteristics which are the reverse of these characteristics G, is inserted into the path 34 between modulator 28 and the driver 25 of FIG. 1. By doing this, the transfer signal TR modulation degree with respect to the optical output of the EDF 11 are held constant, regardless of the frequency of the transfer signal TR.

Figure 7:
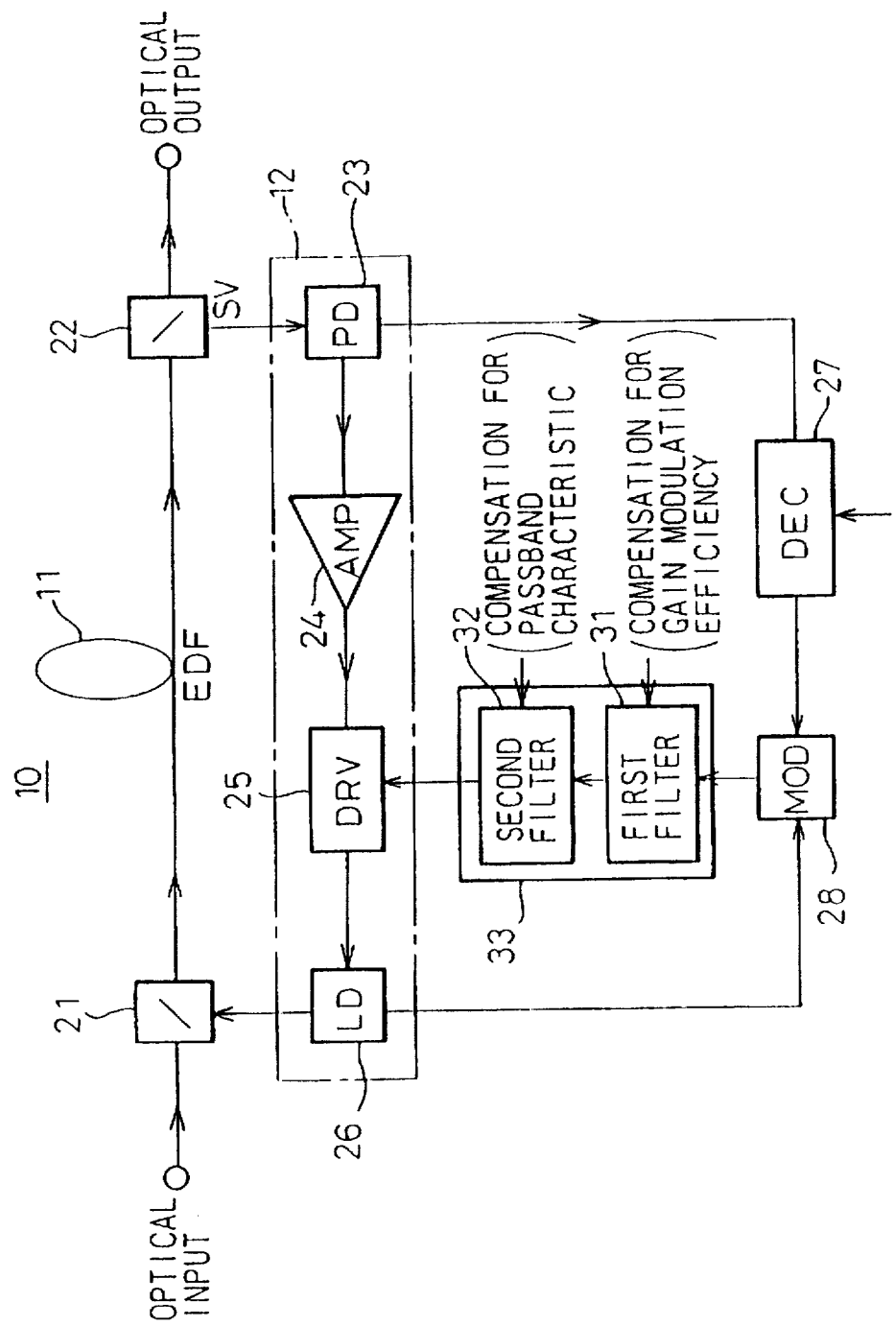
FIG. 7 is a drawing which shows an example of an optical amplifying repeater which includes the third filter 33.

FIG. 7 is a drawing which shows an example of an optical amplifying repeater which includes the third filter 33. It is possible to use the first and second filters 31 and 32 of FIG. 3 and FIG. 5, respectively, individually, and also possible to use these in a combined form, which is shown as the third filter 33 in FIG. 7 (and also in FIG. 1). By using this third filter 33, it is possible to cover the wide frequency ranges of [1]+[2] shown in FIG. 2. This third filter 33 is merely a combination of the first filter 31 and the second filter 32.

Figure 8:
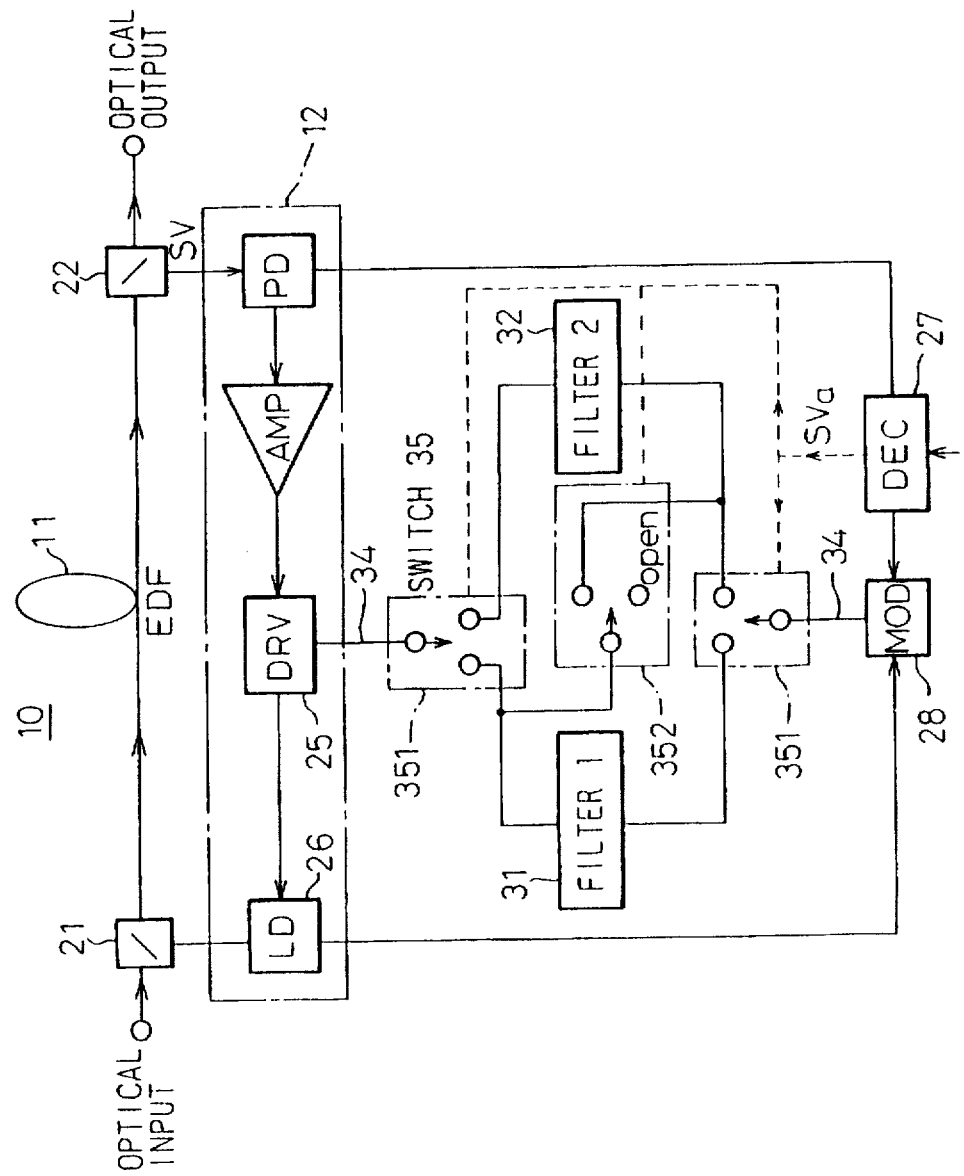
FIG. 8 is a drawing which shows a specific example of the switch means 35 of FIG. 1.

FIG. 8 is a drawing which shows a specific example of the switch means 35 of FIG. 1. In this drawing, the switch means 35 of FIG. 1 is implemented by switches 351, 352, and 353. By altering the connection condition of these switches, it is possible to make selection of one of the following conditions.

"1" First filter 31 only inserted.

"2" Second filter 32 only inserted.

"3" Both the first filter 31 and the second filter 32 inserted FIG. 7.

"4" These filters are eliminated and the path is short-circuited.

Figure 9:
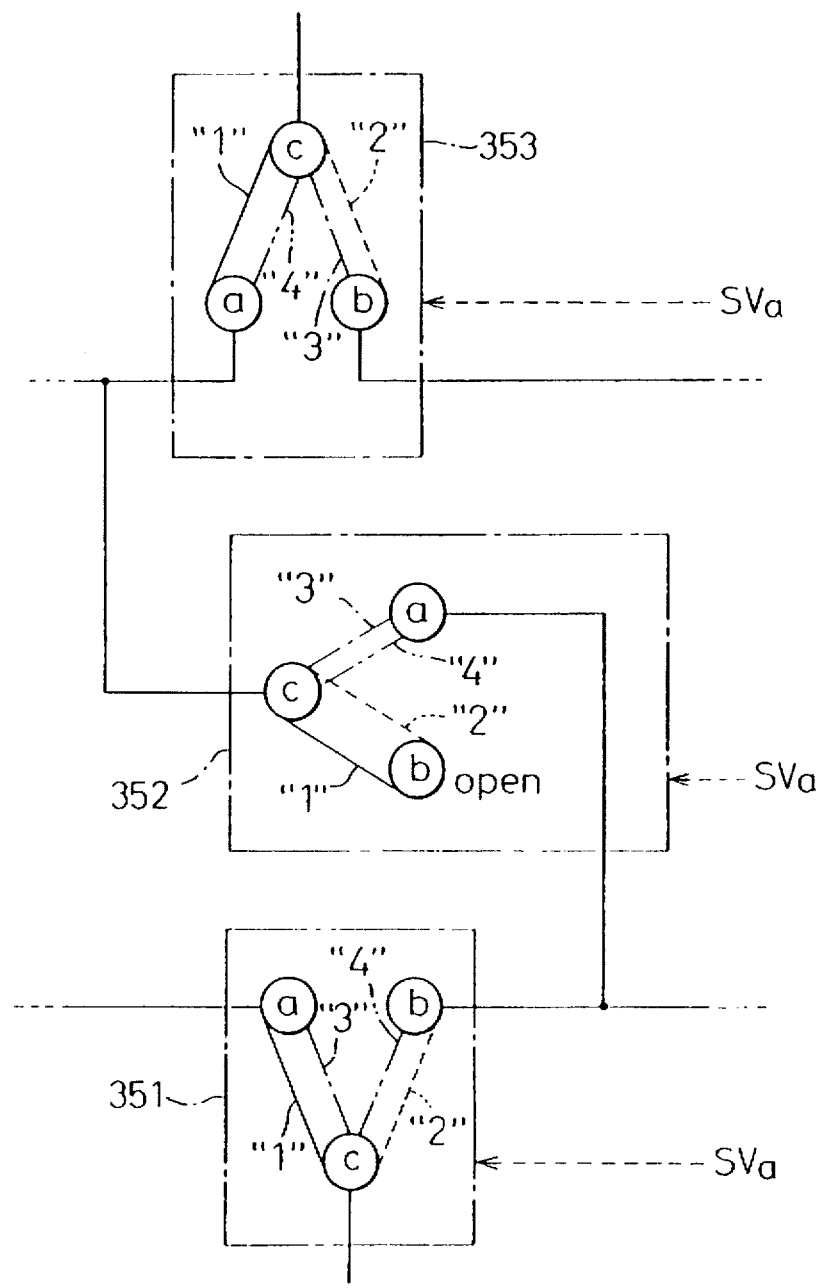
FIG. 9 is a drawing which shows an easy-to-understand view of the method of connection of the switch of FIG. 8.

FIG. 9 is a drawing which shows, in easy-to-understand form, the connection states of the switches shown in FIG. 8. The four above-noted modes "1" through "4" correspond respectively to the "1" through "4" connection states indicated in this drawing.

It is desirable that the change-over between these four modes be possible remotely from, for example, an end office. For this reason, a switching signal $SV_a$ is included in the above-noted monitor signal SV, this switching signal $SV_a$ causing change-over of the connection state. In the case of two bits for identification of the switches 351 through 353 and one bit to specify connection of the contact c with either contact a or contact b, this switching signal $SV_a$ comprises three bits.

Figure 10:
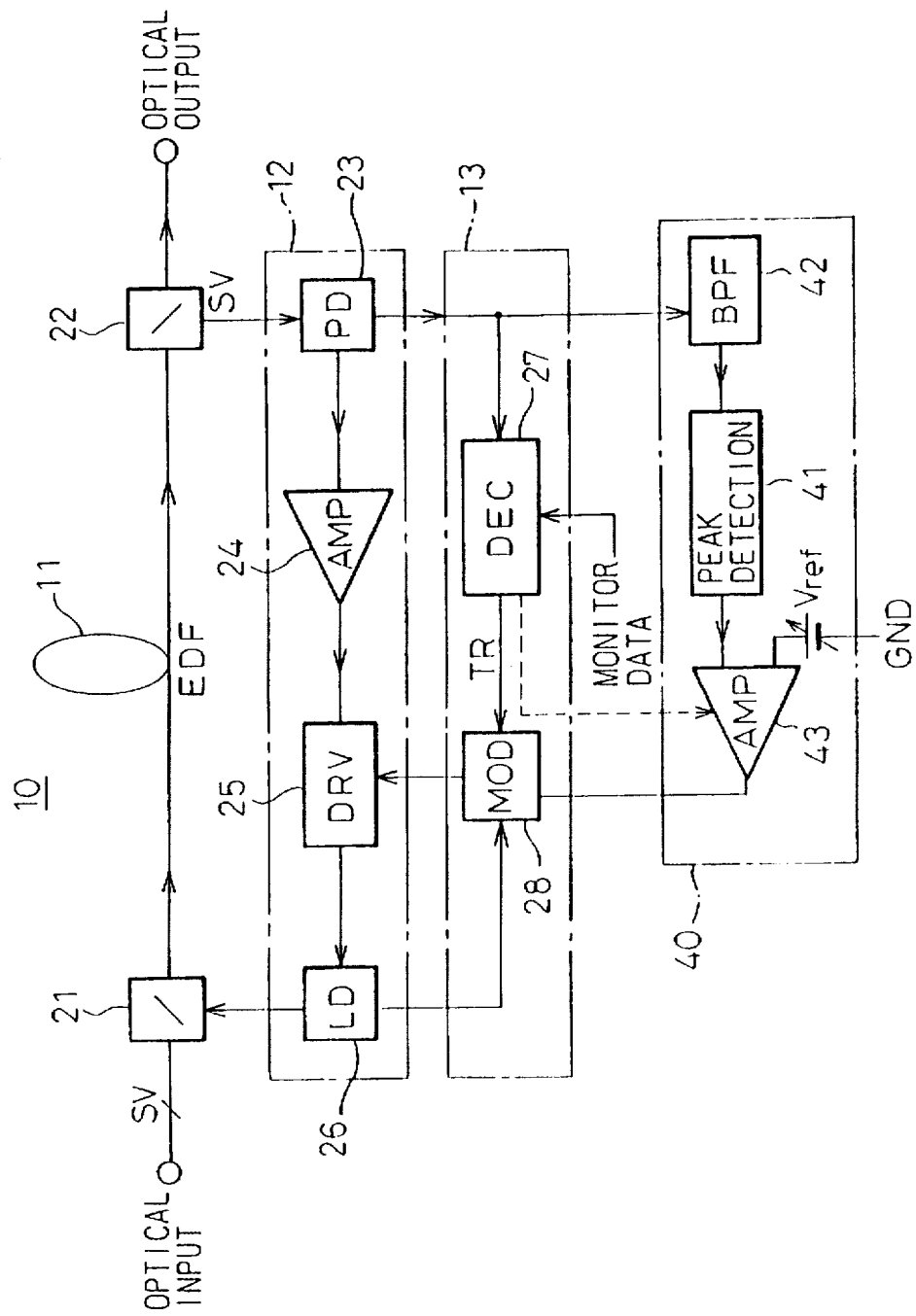
FIG. 10 is a drawing which shows an example of the configuration based on another principle according to the present invention.

FIG. 10 is a drawing which shows an example of a configuration based on another principle of the present invention. As shown in this drawing, a modulation degree setting means 40 is incorporated. Described earlier, because of the existence of the automatic adjusting loop 12, the average value of the optical output of the EDF 11 is held constant. The peak value of the transfer signal TR component is detected. By doing this, the amplitude of the transfer signal TR is determined. By applying this to control elements (driver 25) in the automatic adjusting loop 12, it is possible to perform control so as to maintain the detected output as constant at all times. That is, the amplitude of the transfer signal TR which is included in the optical output of the EDF 11 is maintained constant at all times. As a result, the transfer signal TR modulation degree with respect to the optical output is held constant, regardless of the frequency of the transfer signal TR.

More specifically, the transfer signal TR which passes through a photodetector (PD) 23, including the peak detection unit 41, is extracted by means of a bandpass filter (BPF) 42, after which the peak value thereof is detected by the peak detection unit 41. The detected peak value passes through the an amplifier (AMP) 43 and is applied to a modulator (MOD) 28.

More desirably, a reference voltage which serves as the comparison criterion for the purpose of maintaining the above-noted detected peak value constant is variable by means of external control, and the modulation degree can be arbitrarily set by means of the modulation degree setting means 40. In this case, a command for the purpose of arbitrarily setting the modulation degree from, for example, an end office, is included in and sent with the monitor signal SV, and when this signal is input, the above-noted command is sent from the decoder 27 to the amplifier 43. In actuality, the voltage $V_{ref}$ in this figure is variably adjusted.

Figure 11:
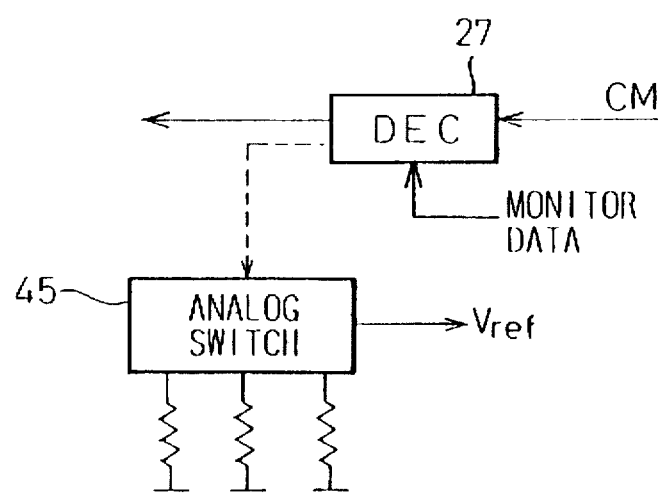
FIG. 11 is a drawing which shows an example of a control circuit for the reference voltage in FIG. 10.

FIG. 11 is a drawing which shows an example of a control circuit for the reference voltage in FIG. 10. The reference voltage $V_{ref}$ shown in FIG. 10 can be varied by means of, for example, the circuit shown in this drawing. The configuration is such that a modulation degree command CM included in the monitor signal SV is sent from, for example, an end office, and decoded by a decoder (DEC) 27. In response to the decoded value the analog switch 45 is controlled (external control).

Figure 12:
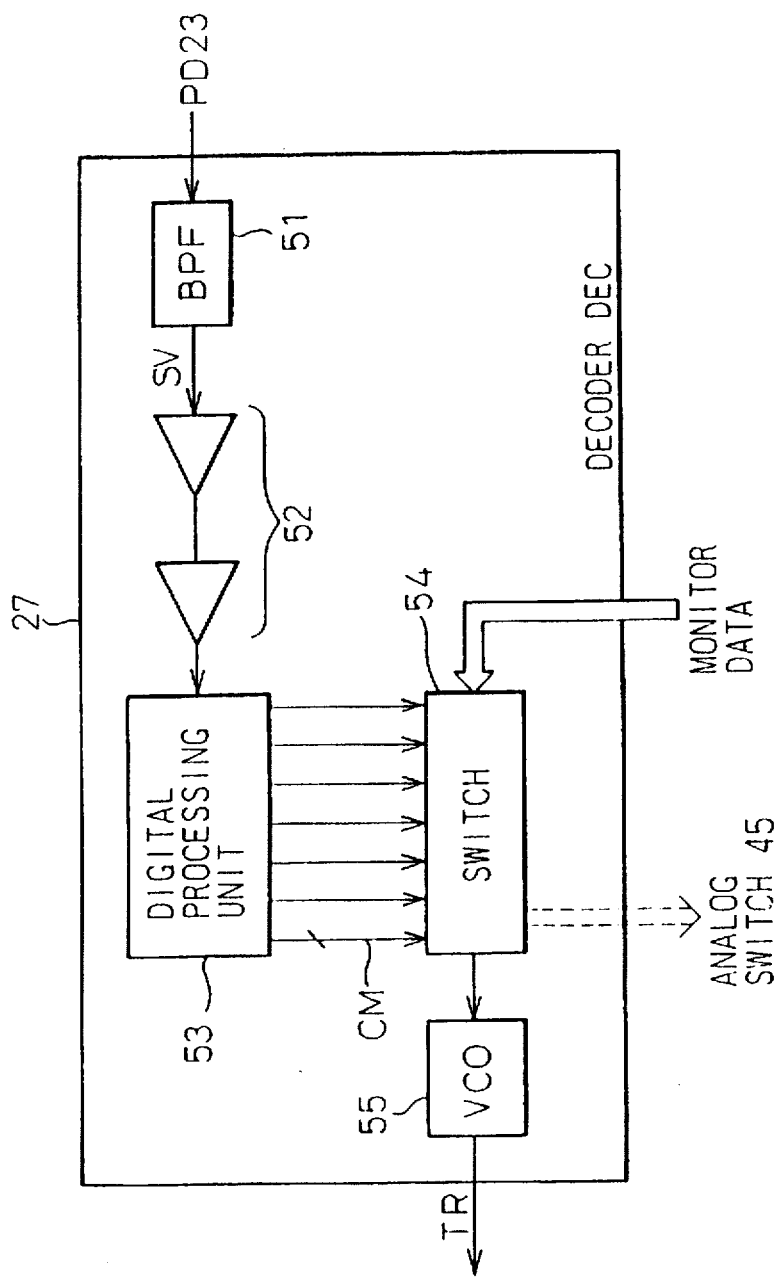
FIG. 12 is a drawing which shows a specific example of the decoder 27.

FIG. 12 is a drawing which shows a specific example of the decoder 27. The above-noted decoder 27 receives at its input the optical output of the photodetector (PD) 23, from which it extracts the monitor signal SV, by means of the bandpass filter (BPF) 51. After this is controlled by the amplifier 52 so as to have a constant output, it is input to the digital processing unit 53.

The digital processing unit 53 comprises a large number of flip-flops (FFs) and digital circuitry, and extracts from the monitor signal SV the data which specifies one monitor data to be monitored among data such as temperature, output level, and input level. For example, if the data specifies that temperature is to be monitored, the path for data of the monitor data relating to temperature is set by making a switch in the switch 54 on, so that the corresponding temperature which is stored in a register (not shown in the drawing) is applied to a VCO (voltage-controlled oscillator) 55. The VCO outputs, as the transfer signal TR, a pulse train having a frequency which corresponds to the temperature data.

Referring to the case shown in the above-noted FIG. 11, the digital processing unit 53 extracts the above-described modulation degree command CM from the monitor signal SV, the semiconductor elements in the analog switch 45 specified by this command CM being set to on/off, so as to output the desired reference voltage $V_{ref}$.

Figure 13:
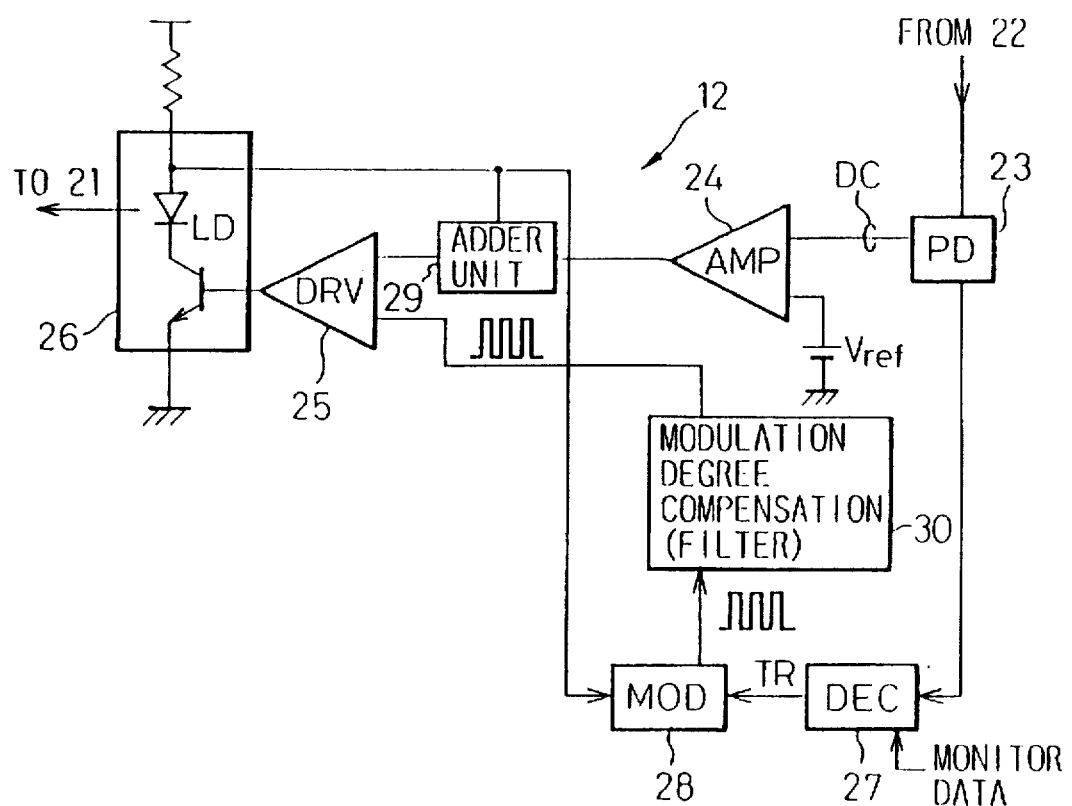
FIG. 13 is a drawing which shows an example the automatic adjusting loop 12 of FIG. 1.

FIG. 13 is a drawing which shows an example of an automatic adjusting loop 12 shown in FIG. 1, this drawing illustrating the case of a loop implemented by the output light power fixing method.

The deviation of the optical output of the EDF 11 is detected by the photodetector (PD) 23 in the form of a DC component. In addition, the amplifier 24 detects the deviation relative to the reference voltage $V_{ref}$. This deviation passes through an adder unit 29 and is applied to the driver (DRV) 25, thus performing control of the optical generator (laser diode LD) 26 so that the optical output level is held constant.

The transfer signal TR from the decoder (DEC) 27 passes through the modulator (MOD) 28, and is filtered by means of the filter characteristics prescribed by the modulation degree compensation means 30 according to the present invention, after which it is input to the driver 25 via the adder unit 29. At the modulator 28, amplitude control proportional to the output level from the laser diode (LD) 26 is applied with respect to the transfer signal TR from the decoder 27. This is done to establish input balance at the driver 25.

While FIG. 13 shows operation of the output light power fixing method as the automatic adjusting loop 12, in the present invention, it is also possible to operate the pumping light power-fixing method as the automatic adjusting loop 12.

Figure 14:
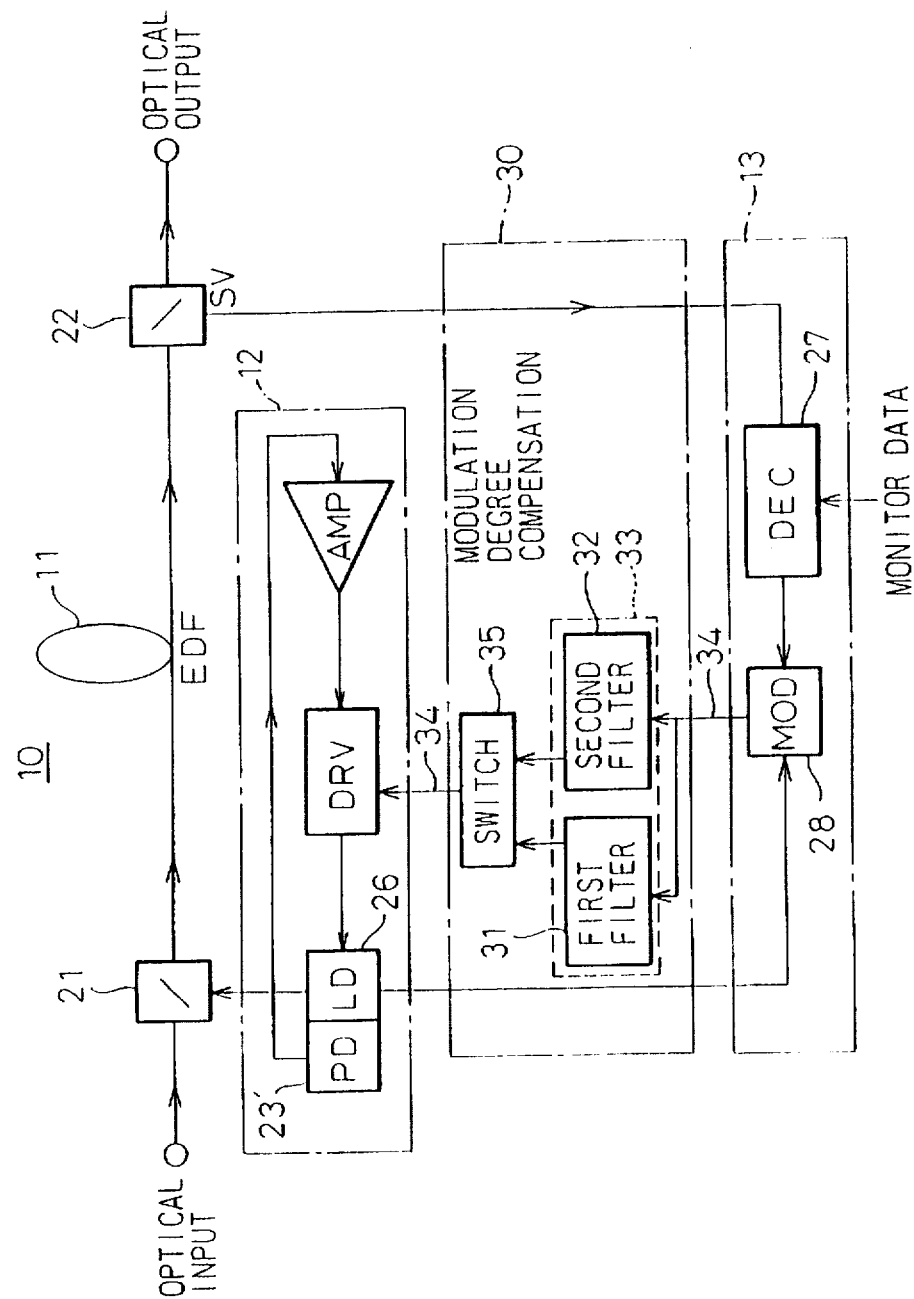
FIG. 14 is a drawing which shows the case in which an automatic adjusting loop 12 constructed by a pumping light power-fixing method is used in the configuration of FIG. 1.

FIG. 14 is a drawing which shows the case of using, in the configuration of FIG. 1, an automatic adjusting loop 12 of the pumping light power-fixing method type. The pumping light power-fixing method is a method of holding constant the pumped laser diode (LD) output optical power. The pumped laser diode (LD) power is monitored by means of the backward light power monitor photodiode (PD) 23', and passes the amplifier 24 and the driver 25, so that the pumped laser diode (LD) output is controlled so as to be held constant at all times.

In this pumping light power-fixing method, in the case in which an optical signal is relayed through multiple stages of repeaters, the optical output is constant, due to saturation of the EDF 11. For this reason, in the same manner as described for the output light power fixing method, the transfer signal TR modulation degree in the optical output is not held constant with respect to the frequency.

Even when using this pumping light power-fixing method, in exactly the same manner as described for the output light power fixing method, it is possible to provide a modulation degree compensation means 30 and a modulation degree setting means 40.

Figure 15:
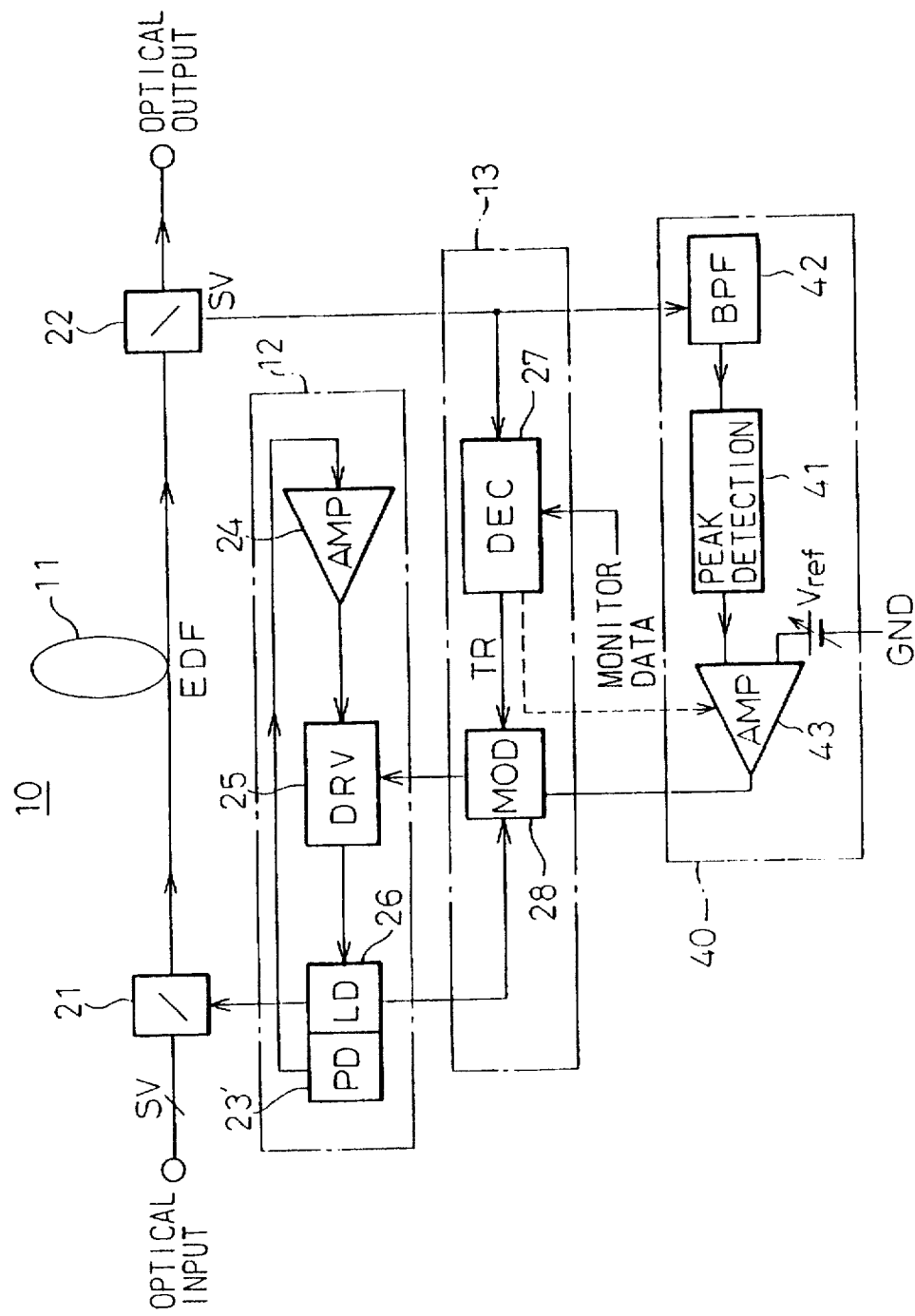
FIG. 15 is a drawing which shows the case in which an automatic adjusting loop 12 constructed by a pumping light power-fixing method is used in the configuration of FIG. 10.

FIG. 15 is a drawing which shows the case of using, in the configuration of FIG. 10, the automatic adjusting loop 12 of the pumping light power-fixing method type. It represents the incorporation into FIG. 10 of the pumping light power-fixing method type loop (12) of FIG. 14. The object of the present invention is achieved in this case as well.

The following effects are achieved by the above-described aspects of the present invention.

According to the above-described first aspect of the present invention, it is possible to hold the transfer signal TR modulation degree with respect to the optical output of the EDF 11 constant, regardless of the frequency of the transfer signal TR. Therefore, the problems of reception being impossible because of a drop in the level of the transfer signal TR, and of the deterioration of the monitor signal SV due to the increase in the level of the signal TR are eliminated.

According to the above-described second aspect of the present invention, compensation for the gain modulation efficiency (E) is provided.

According to the above-described third aspect of the present invention, compensation for the passband characteristics (G) is provided.

According to the above-described fourth aspect of the present invention, compensation for both the gain modulation efficiency (E) and the passband characteristics (G) is provided.

According to the above-described fifth aspect of the present invention, a switch change-over is used to implement flexible compensation by a variety of filter characteristics.

According to the above-described sixth aspect of the present invention, by externally controlling the above-noted switch, it is possible to remotely specify the above-noted compensation characteristics.

According to the above-described seventh aspect of the present invention, it is possible to hold the transfer signal TR modulation degree with respect to the optical output of the EDF 11 constant, regardless of the frequency of the transfer signal TR.

According to the above-described eighth aspect of the present invention, it is possible to perform the setting of the modulation degree as in the above-noted seventh aspect simply, by means of a transfer signal TR peak detection unit.

According to the above-described ninth aspect of the present invention, it is possible to perform arbitrary setting of the modulation degree remotely.

It is possible to apply the same present invention to either the output light power fixing method or the pumping light power-fixing method.

What is claimed is:

1. An optical amplifying repeater comprising:

a rare earth element doped fiber which receives and amplifies a high-frequency monitor signal;

an automatic adjusting loop which performs adjustment of the optical amplification degree so that it is automatically maintained at a prescribed constant value;

a monitor and response unit which, in response to said monitor signal, generates a transfer signal and via said automatic adjustment loop modulates said monitor signal in accordance with the transfer signal, and inputs it to said rare earth element doped fiber; and a modulation means degree compensation which includes at least one filter providing frequency characteristics which are inverse of frequency characteristics being exhibited by said rare earth element doped fiber, and thereby holding approximately constant said transfer signal modulation degree with respect to the optical output from said rare earth element doped fiber, regardless of the frequency of said transfer signal.

2. An optical amplifying repeater according to claim 1, wherein said modulation degree compensation means comprises a first filter, said first filter being provided with filter gain versus frequency characteristics which are the reverse of the gain modulation efficiency versus frequency characteristics of said rare earth element doped fiber.

3. An optical amplifying repeater comprising:

a rare earth element doped fiber which receives and amplifies a high-frequency monitor signal;

an automatic adjusting loop which performs adjustment of the optical amplification degree so that it is automatically maintained at a prescribed constant value; and a monitor and response unit which, in response to said monitor signal, generates a transfer signal and via said automatic adjustment loop modulates said monitor signal in accordance with the transfer signal, and inputs it to said rare earth element doped fiber; wherein a modulation degree compensation means is provided which holds approximately constant said transfer signal modulation degree with respect to the optical output from said rare earth element doped fiber, regardless of the frequency of said transfer signal, wherein said modulation degree compensation means comprises a second filter, said second filter being provided with filter gain versus frequency characteristics which are the reverse of the passband frequency characteristics which represent the gain versus frequency characteristics of said rare earth element doped fiber.

4. An optical amplifying repeater comprising:

a rare earth element doped fiber which receives and amplifies a high-frequency monitor signal:

an automatic adjusting loop which performs adjustment of the optical amplification degree so that it is automatically maintained at a prescribed constant value; and a monitor and response unit which, in response to said monitor signal, generates a transfer signal and via said automatic adjustment loop modulates said monitor signal in accordance with the transfer signal, and inputs it to said rare earth element doped fiber; wherein a modulation degree compensation means is provided which holds approximately constant said transfer signal modulation degree with respect to the optical output from said rare earth element doped fiber, regardless of the frequency of said transfer signal, wherein said modulation degree compensation means comprises a third filter, said third filter being provided with both filter gain versus frequency characteristics which are the reverse of the gain modulation efficiency versus frequency characteristics of said rare earth element doped fiber and filter gain versus frequency characteristics which are the reverse of the passband frequency characteristics which represent the gain versus frequency characteristics of said rare earth element doped fiber.

5. An optical amplifying repeater comprising:

a rare earth element doped fiber which receives and amplifies a high-frequency monitor signal;

an automatic adjusting loop which performs adjustment of the optical amplification degree so that it is automatically maintained at a prescribed constant value; and a monitor and response unit which, in response to said monitor signal, generates a transfer signal and via said automatic adjustment loop modulates said monitor signal in accordance with the transfer signal, and inputs it to said rare earth element doped fiber; wherein a modulation degree compensation means is provided which holds approximately constant said transfer signal modulation degree with respect to the optical output from said rare earth element doped fiber, regardless of the frequency of said transfer signal, wherein said modulation degree compensation means, which comprises both a first filter and a second filter, and a switch means are inserted in a path between said automatic adjusting loop and said monitor and response unit, and further wherein said switch means performs change-over so as to select one of insertion of said first filter only into said path, insertion of said second filter only into said path, insertion of both said first filter and said second filter into said path, and elimination of both filters and short-circuiting of said path, said first filter having filter gain versus frequency characteristics which are the reverse of the gain modulation efficiency versus frequency characteristics of said rare earth doped fiber and said second filter having filter gain versus frequency characteristics which are the reverse of the passband characteristics which represent the gain versus frequency characteristics of said rare earth doped fiber.

6. An optical amplifying repeater according to claim 5, wherein change-over by means of said switch means is performed by a remote operation by means of a switching signal which is included in said monitor signal.

7. An optical amplifying repeater comprising:

a rare earth element doped fiber which receives and amplifies a high-frequency monitor signal;

an automatic adjusting loop which performs adjustment of the optical amplification degree so that it is automatically maintained at a prescribed constant value;

a monitor and response unit which, in response to said monitor signal, generates a transfer signal and via said automatic adjustment loop modulates said monitor signal in accordance with the transfer signal, and inputs it to said rare earth element doped fiber; and a modulation degree setting means which is operative to make the peak value of said transfer signal constant, and thereby holding approximately constant said transfer signal modulation degree with respect to the optical output from said rare earth element doped fiber, regardless of the frequency of said transfer signal.

8. An optical amplifying repeater according to claim 7, where said modulation degree setting means comprises a peak detection unit which extracts from the optical output of said rare earth element doped fiber the component of said transfer signal and detects the peak value thereof, said peak detection unit control of said automatic adjusting loop being performed so that the peak value detected by said peak detection unit is held constant.

9. An optical amplifying repeater according to claim 8, wherein a reference voltage which serves as a comparison criterion for the purpose of holding said detected peak value constant can be variable by means of external control, and whereby the modulation degree set by means of said modulation degree setting means can be arbitrarily set.

10. An optical amplifying repeater according to claim 1, wherein said automatic adjusting loop operates by one of output light power fixing method and the pumping light power-fixing method.

11. An optical amplifying repeater according to claim 7, wherein said automatic adjusting loop operates by one of output light power fixing method and the pumping light power-fixing method.

* * * * *